(12) United States Patent
Staker et al.

(10) Patent No.: US 7,649,571 B2
(45) Date of Patent: *Jan. 19, 2010

(54) METHODS FOR INTERACTIVE VIDEO COMPOSITING

(75) Inventors: Allan Robert Staker, Long Beach, CA (US); Heather Clayton Staker, Long Beach, CA (US)

(73) Assignee: YooStar Entertainment Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/482,834

(22) Filed: Jun. 11, 2009

(65) Prior Publication Data

US 2009/0237566 A1 Sep. 24, 2009

Related U.S. Application Data

(63) Continuation of application No. 12/256,374, filed on Oct. 22, 2008, which is a continuation of application No. 10/836,729, filed on Apr. 30, 2004, now Pat. No. 7,528,890.

(60) Provisional application No. 60/467,480, filed on May 2, 2003.

(51) Int. Cl.
*H04N 9/75* (2006.01)
(52) U.S. Cl. .................. 348/592; 348/584; 348/598; 348/722
(58) Field of Classification Search ............... 348/592, 348/584–587, 589–591, 598, 36, 42, 218, 348/239, 722, 578, 705–706; 386/45–46, 386/52, 53–64, 117, 95; 725/89, 134, 142; *H04N 9/75*
See application file for complete search history.

(56) References Cited

U.S. PATENT DOCUMENTS 4,122,490 A 10/1978 Lish (Continued)

FOREIGN PATENT DOCUMENTS

EP 0 867 839 A2 9/1998

(Continued)

OTHER PUBLICATIONS

U.S. Appl. No. 12/482,785, filed Jun. 11, 2009, Staker et al.

(Continued)

*Primary Examiner*—Trang U Tran
(74) *Attorney, Agent, or Firm*—Knobbe, Martens, Olson & Bear, LLP

(57) ABSTRACT

An interactive video compositing device includes a chroma-key mixer, video switcher and control circuitry. The chroma-key mixer generates a composite image by combining a real-time image, such as one captured by a video recorder, with a prerecorded video image, such as a movie. The composite image includes the modified real-time image superimposed, or overlaid, onto the prerecorded image. The video switcher automatically selects either the composite image or the prerecorded image to be output to a display. The control circuitry controls the video switcher and other outputted signals based on data file information that corresponds to content of the prerecorded image or media. For example, the data files may contain information relating to the presence (or absence) of a particular character in a movie scene, thus allowing for the output and display, at appropriate times, of the real-time composite image instead of the prerecorded image.

10 Claims, 5 Drawing Sheets

U.S. PATENT DOCUMENTS

| | | |
|---|---|---|
| 4,357,624 A | 11/1982 | Greenberg |
| 4,521,014 A | 6/1985 | Sitrick |
| 4,599,611 A | 7/1986 | Bowker et al. |
| 4,688,105 A | 8/1987 | Bloch et al. |
| 4,710,873 A | 12/1987 | Breslow et al. |
| 4,800,432 A | 1/1989 | Barnett et al. |
| 4,827,344 A | 5/1989 | Astle et al. |
| 4,891,748 A | 1/1990 | Mann |
| 4,968,132 A | 11/1990 | Ferren |
| 5,099,337 A | 3/1992 | Cury |
| 5,151,793 A | 9/1992 | Ito et al. |
| 5,184,295 A | 2/1993 | Mann |
| 5,249,967 A | 10/1993 | O'Leary et al. |
| 5,381,184 A | 1/1995 | Gehrmann |
| 5,428,401 A | 6/1995 | Hinson |
| 5,500,684 A | 3/1996 | Uya |
| 5,553,864 A | 9/1996 | Sitrick |
| 5,566,251 A | 10/1996 | Hanna et al. |
| 5,681,223 A | 10/1997 | Weinreich |
| 5,751,337 A | 5/1998 | Allen et al. |
| 5,764,306 A | 6/1998 | Steffano |
| 5,830,065 A | 11/1998 | Sitrick |
| 5,861,881 A | 1/1999 | Freeman et al. |
| 5,953,076 A | 9/1999 | Astle et al. |
| 5,982,350 A | 11/1999 | Hekmatpour et al. |
| 6,061,532 A | 5/2000 | Bell |
| 6,072,537 A | 6/2000 | Gurner et al. |
| 6,072,933 A | 6/2000 | Green |
| 6,086,380 A | 7/2000 | Chu et al. |
| 6,122,013 A | 9/2000 | Tamir et al. |
| 6,126,449 A | 10/2000 | Burns |
| 6,198,503 B1 | 3/2001 | Weinreich |
| 6,283,858 B1 | 9/2001 | Hayes, Jr. et al. |
| 6,285,408 B1 | 9/2001 | Choi et al. |
| 6,335,765 B1 | 1/2002 | Daly et al. |
| 6,350,199 B1 | 2/2002 | Williams et al. |
| 6,351,265 B1 | 2/2002 | Bulman |
| 6,384,821 B1 | 5/2002 | Borrel et al. |
| 6,400,374 B2 * | 6/2002 | Lanier ..................... 345/630 |
| 6,425,825 B1 | 7/2002 | Sitrick |
| 6,476,874 B1 | 11/2002 | Ito et al. |
| 6,522,787 B1 | 2/2003 | Kumar et al. |
| 6,624,853 B1 | 9/2003 | Latypov |
| 6,750,919 B1 | 6/2004 | Rosser |
| 6,816,159 B2 | 11/2004 | Solazzi |
| 6,835,887 B2 | 12/2004 | Devecka |
| 6,881,067 B2 | 4/2005 | Tarry |
| 6,919,892 B1 | 7/2005 | Cheiky et al. |
| 6,937,295 B2 | 8/2005 | Islam et al. |
| 6,954,498 B1 | 10/2005 | Lipton |
| 7,015,978 B2 | 3/2006 | Jeffers et al. |
| 7,027,054 B1 | 4/2006 | Cheiky et al. |
| 7,053,915 B1 * | 5/2006 | Jung et al. .................. 345/633 |
| 7,079,176 B1 | 7/2006 | Freeman et al. |
| 7,106,906 B2 | 9/2006 | Iwamura |
| 7,137,892 B2 | 11/2006 | Sitrick |
| 7,181,081 B2 | 2/2007 | Sandrew |
| 7,209,181 B2 | 4/2007 | Kriegman |
| 7,221,395 B2 | 5/2007 | Kinjo |
| 7,230,653 B1 | 6/2007 | Overton et al. |
| 7,268,834 B2 | 9/2007 | Lundberg et al. |
| 7,285,047 B2 | 10/2007 | Gelb et al. |
| 7,319,493 B2 | 1/2008 | Hata et al. |
| 7,324,166 B1 | 1/2008 | Joslin et al. |
| 7,400,752 B2 | 7/2008 | Zacharias |
| 7,495,689 B2 | 2/2009 | Curtis et al. |
| 7,528,890 B2 | 5/2009 | Staker et al. |
| 2002/0007718 A1 | 1/2002 | Corset |
| 2002/0130889 A1 | 9/2002 | Blythe et al. |
| 2003/0051255 A1 | 3/2003 | Bulman et al. |
| 2003/0148811 A1 | 8/2003 | Sitrick |
| 2004/0100581 A1 | 5/2004 | Williams |
| 2005/0028193 A1 | 2/2005 | Candelore et al. |
| 2005/0151743 A1 | 7/2005 | Sitrick |
| 2005/0207730 A1 | 9/2005 | Iwamura |
| 2005/0215319 A1 | 9/2005 | Rigopulos et al. |
| 2006/0046847 A1 | 3/2006 | Hashimoto |
| 2006/0125962 A1 | 6/2006 | Shelton et al. |
| 2006/0136979 A1 | 6/2006 | Staker et al. |
| 2006/0262696 A1 | 11/2006 | Woerlee |
| 2008/0085766 A1 | 4/2008 | Sitrick |
| 2008/0090679 A1 | 4/2008 | Browne et al. |
| 2009/0040385 A1 | 2/2009 | Staker et al. |
| 2009/0041422 A1 | 2/2009 | Staker et al. |

FOREIGN PATENT DOCUMENTS

| | | |
|---|---|---|
| JP | 60-190078 | 9/1985 |
| JP | 63-178677 | 7/1988 |
| JP | 1-228288 | 9/1989 |
| JP | 2-127886 | 5/1990 |
| JP | 3-261279 | 11/1991 |
| JP | 4-220885 | 8/1992 |
| JP | 05-014810 | 1/1993 |
| JP | 5-284522 | 10/1993 |
| JP | 09-219836 | 8/1997 |
| JP | 11-069228 | 3/1999 |
| JP | 11252459 | 9/1999 |
| JP | 2000-209500 | 7/2000 |
| JP | 2002-077726 | 3/2002 |
| JP | 2002-232783 | 8/2002 |
| JP | 2002-281465 | 9/2002 |
| WO | WO 93/06691 | 4/1993 |
| WO | WO 01/63560 | 8/2001 |
| WO | WO 02/071763 A1 | 9/2002 |
| WO | WO 2005/076618 A1 | 8/2005 |

OTHER PUBLICATIONS

NBC Studios, DVD of "Conan O'Brien's Wild Desk Ride" at NBC Studio Tour at Rockefeller Plaza, New York City, New York; video believed to be taken at least as early as Apr. 2002.

R. Braham; "The Digital Backlot"; IEEE Spectrum, vol. 32; Issue 7; pp. 51-63; Jul. 1995.

A.J. Schofield et al.; "A System for Counting People in Video Images using Neural Networks to Identify the Background Scene"; *Pattern Recognition*; vol. 29, No. 8, pp. 1421-1428; Elsevier Science Ltd. Great Britain; 1996.

S. Alliney et al.; "On Registration of an Object Translating on a Static Background"; *Pattern Recognition*; vol. 29, No. 1, pp. 131-141; Elsevier Science Ltd. Great Britian; 1996.

Til Aach et al.; "Disparity-Based Segmentation of Stereoscopic Foreground/Background Image Sequences"; *IEEE Transactions on Communications*; vol. 42, No. 2/3/4; pp. 673-679; 1994.

Franco Caroti Ghelli; "A Sequential Learning Method for Boundary Detection," *Pattern Recognition;* vol. 21, No. 2, pp. 131-139; Great Britain; 1988.

Nikhil R. Pal et al.; "A Review on Image Segmentation Techniques"; *Pattern Recognition*; vol. 26, No. 9, pp. 1277-1294; Great Britain; 1993.

G.Y. Georgiannakis et al.; "Design of an Immersive Teleconferencing Application"; Institute of Computer Science, Forth and Department of Computer Science, University of Crete; Dated: 1996; 14 pages.

* cited by examiner

METHODS FOR INTERACTIVE VIDEO COMPOSITING

RELATED APPLICATIONS

This application is a continuation of U.S. patent application Ser. No. 12/256,374, filed Oct. 22, 2008, which is a continuation of U.S. patent application Ser. No. 10/836,729, filed Apr. 30, 2004, now U.S. Pat. No. 7,528,890, issued May 5, 2009, which claims the benefit of priority under 35 U.S.C. § 119(e) of U.S. Provisional Application No. 60/467,480, filed May 2, 2003, and entitled "INTERACTIVE SYSTEM FOR REAL-TIME CHROMA KEY COMPOSITING," each of which is hereby incorporated herein by reference in its entirety to be considered part of this specification.

BACKGROUND OF THE INVENTION

1. Field of the Invention

Preferred embodiments of the invention relate to a system and method for signal compositing, and more particularly, to a system and method for interactive video compositing.

2. Description of the Related Art

Interactive entertainment is a popular leisure activity for people across the globe. One favorite activity for many is karaoke, which temporarily turns lay persons into "stars" as they sing the lyrics to a favorite song. Karaoke machines play the music of a selected song while simultaneously displaying the song lyrics to a user, thus allowing the user to sing along with the background music.

Another favorite leisure activity for millions is watching movies. Billions of dollars are spent each year on ticket sales for new box office hits. In addition, an increasing number of people are beginning to view movies at home. One popular technology that has been recently adopted is the digital video disk (DVD) technology. Movies are recorded in digital format onto a disk that allows for repeated viewings at the convenience of the user. The sound and picture quality of DVDs, along with the convenient features that accompany digital media, have made DVDs a popular replacement to standard video cassette technology.

However, movie watching has predominantly been a passive activity. That is, one either travels to a theater or inserts a disk into a DVD player and sits back to watch the movie. Though one may watch the same movie repeatedly, each time the same characters appear and recite the same lines and perform the same actions. As of yet, one has not been able to act out his or her favorite scene while appearing to be in the movie itself in a real-time manner.

SUMMARY OF THE INVENTION

Accordingly, there is a need for an interactive system that allows for video images to be inserted into a prerecorded video, such as a movie. In one embodiment of the present invention, chroma-key technology is used to produce a composite video image, wherein it appears that a target image, such as one captured by a video camera, is superimposed in real time onto a prerecorded image. The compositing process is managed by internal circuitry and data files that direct when and how the real-time image is inserted into the prerecorded image.

In one embodiment, an interactive video compositing device includes a mixer, video switcher and control circuitry. The mixer utilizes chroma-key technology to remove a chroma element from a real-time video image. The mixer combines the modified image with a prerecorded video image to form a composite image, which includes the modified real-time image overlaid on the prerecorded image. The video switcher automatically selects either the composite image or the prerecorded image to be output to a display. This selection is managed by the control circuitry and is based on data file information that corresponds to the content of scenes of the prerecorded image. For example, the data files may contain information relating to the presence (or absence) of a particular character in the movie scene, thus allowing for the output of the real-time composite image instead of the prerecorded image at appropriate times.

In another embodiment of the invention, a system for real-time, chroma-key compositing comprises a first input structured to receive a first video signal; a second input structured to receive a second video signal; a chroma-key mixer coupled to the first input and to the second input, wherein the chroma-key mixer is structured to output a composite signal comprising portions of the first video signal and portions of the second video signal; a data file associated with the first video signal, wherein the data file has at least first reference data and second reference data; and a switcher that selects between outputting the composite signal and outputting the first video signal, wherein the switcher outputs the composite signal at a time identified by the first reference data, and wherein the switcher outputs the first video signal at a time identified by the second reference data.

In another embodiment, a reference data system used for video compositing comprises first reference information associated with a first video signal; second reference information associated with the first video signal; and a video switcher configured to switch between outputting either the first video signal or a composite signal that includes portions of the first video signal and portions of a second video signal, wherein the video switcher outputs the composite signal at a time identified by the first reference information, and wherein the video switcher outputs the first video signal at a time identified by the second reference information.

In another embodiment of the invention, a software program comprises code for controlling the superimposing of a real-time image onto a prerecorded image, wherein said code identifies portions of the prerecorded image during which the real-time image is to be superimposed onto the prerecorded image.

In another embodiment, a system for real-time video compositing comprises a means for generating a composite signal by chroma-key mixing a first video signal and a real-time second video signal; and a means for switching between the selection of the first video signal and the selection of the composite signal, wherein the means for switching is controlled according to reference information stored in at least one data file that relates to the first video signal.

In another embodiment, a method for video compositing comprises receiving a first video signal having multiple frames; receiving a second video signal; creating a composite signal by chroma-key mixing the first video signal and the second video signal; and selectively switching, with a video switcher, between outputting the first video signal and outputting the composite signal, wherein said selective switching is performed automatically and is based on a control signal received by the video switcher, wherein the control signal is derived at least in part from prerecorded data that corresponds to frames of the first video signal.

In another embodiment, a method for coordinating the display of multiple signals comprises receiving a first signal; receiving a second signal; forming a composite signal comprising portions of the first signal and portions of the second signal; receiving with a switcher the first signal and the composite signal; receiving reference data that corresponds to portions of the first signal; and switching between displaying the first signal and displaying the composite signal, wherein the timing of said switching is based on information contained in the reference data.

In another embodiment, a method for creating a data file used for controlling the superimposing of video images comprises identifying a portion of a first video image during which a second video image is to be superimposed onto the first video image, said first video image portion having a beginning frame and an ending frame; recording in a data file first information that identifies said beginning frame; and recording in the data file second information that identifies said ending frame.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

The features of the system and method will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the invention.

In addition, methods and functions described herein are not limited to any particular sequence, and the steps or states relating thereto can be performed in other sequences that are appropriate. For example, described steps or states may be performed in an order other than that specifically disclosed, or multiple steps or states may be combined in a single step or state.

Figure 1:
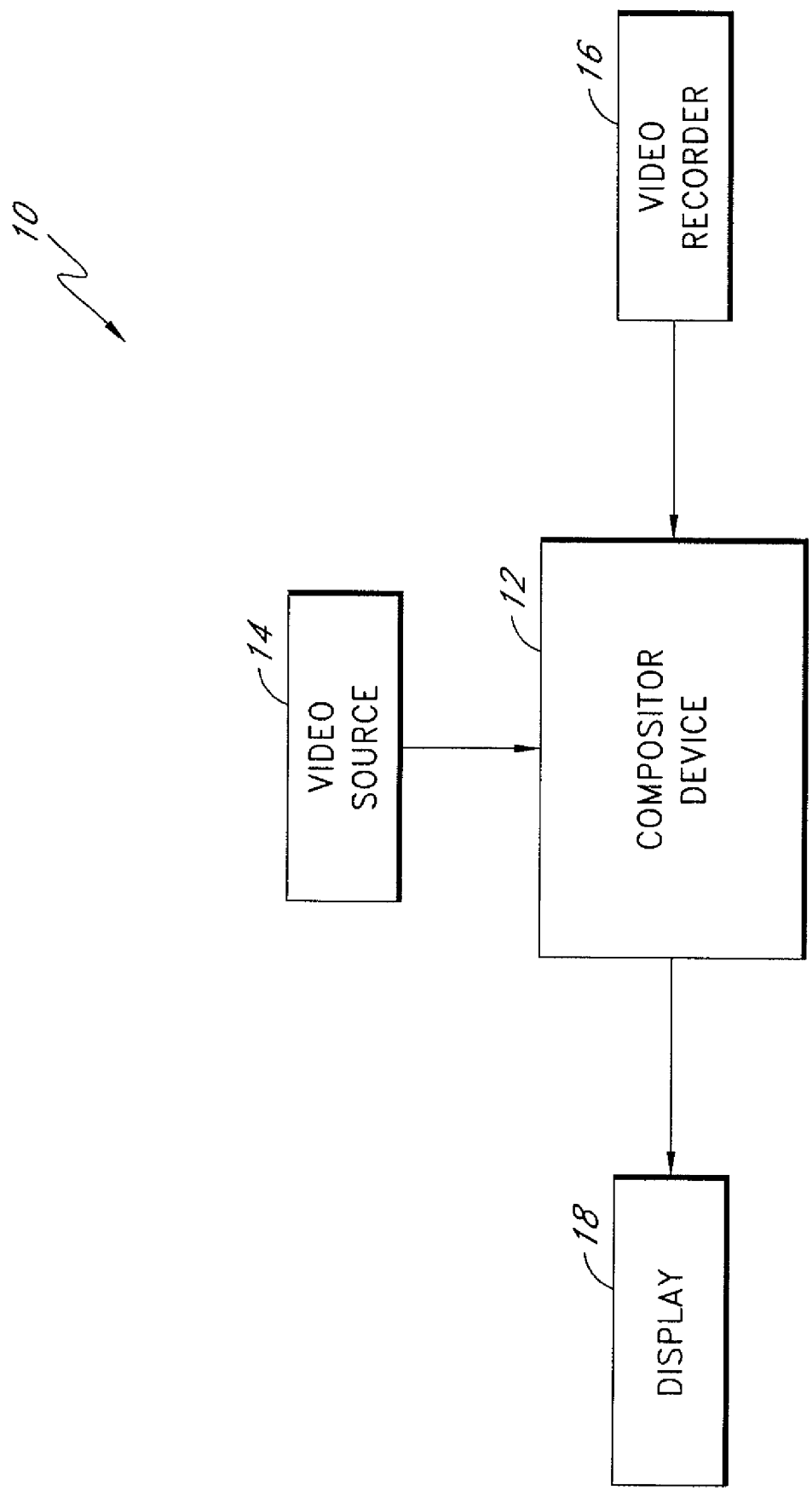
FIG. 1 illustrates a real-time video compositing system according to one embodiment of the invention.

FIG. 1 illustrates one embodiment of a real-time video compositing system 10. The compositing system 10 is used to selectively superimpose images. These images may comprise images that can be viewed in real-time, prerecorded images, or a combination thereof. For example, the compositing system 10 may superimpose a real-time image onto an image that has been prerecorded, such as a movie. The compositing system 10 generally comprises a compositor device 12, a video source 14, a video recorder 16, and a display 18. In the depicted embodiment, the compositor device 12 receives inputs signals from the video source 14 and the video recorder 16 and outputs a signal to the display 18.

The term "compositing" as used herein is a broad term and is used in its ordinary sense and includes without limitation the superimposing or combining of multiple signals, such as, for example, video and/or audio signals, to form a composite signal. The term "compositor" refers to any device or system, implemented in hardware, software, or firmware, or any combination thereof, that performs in whole or in part a compositing function.

The term "real time" as used herein is a broad term and is used in its ordinary sense and includes without limitation a state or period of time during which some event or response takes place. A real-time system or application produces a response to a particular stimulus within a certain response time. For example, a device processing data in real time may process the data as it is received by the device. A real-time signal is one that is capable of being displayed, played back, or processed within a particular time after being received or captured by a particular device or system. In one embodiment, this particular time is on the order of one millisecond. In other embodiments, the particular time may be longer than one millisecond. For example, the particular time may be on the order of hundreds of milliseconds. In other embodiments of the invention, the particular time may be less than one millisecond. For example, the particular time may be on the order of microseconds. In yet other embodiments of the invention, "real time" refers to events simulated at a speed similar to the speed at which the events would occur in real life.

The video source 14 includes any device, system or technology used to generate, receive, capture, read, supply or store video data. In another embodiment, the video source 14 may generate an audiovisual signal that includes a video portion that can be processed to produce a video signal (e.g., to produce a visual image) and an audio portion that can be processed to produce an audio signal (e.g., sound at a level high enough to be heard by a human ear). For example, in one embodiment of the invention, the video source 14 comprises a digital video disk (DVD) player. In another embodiment, the video source 14 comprises a memory that stores data representing video content. In yet other embodiments of the invention, the video source 14 may comprise a device that receives a video transmission, such as through a cable network, a satellite dish, an antenna, or a network. For example, the video source 14 may comprise a television, a video cassette recorder (VCR), a CD+player or a digital video recorder.

In other embodiments of the invention, the compositing system 10 may include multiple video sources 14, each being coupled to the compositor device 12. In such an embodiment, the compositing system 10 may comprise a multiplexer or a switch that selects a signal from one of multiple video sources 14. For example, in one embodiment, the compositing system 10 comprises a DVD player that reads data from a DVD and a cable box that receives a video transmission over a coaxial cable line. A two-input multiplexer may then be used to select between a signal from the DVD player and a signal from the cable box.

The video source 14 may be coupled to the compositor device 12 by any medium that provides for video signal transmission. For example, the video source 12 may be coupled to the compositor device 12 through an RCA cable, an S-cable, a coaxial cable, Ethernet, wireless technologies and the like. One with skill in the art will also recognize that the video source 14 may supply audio content along with video content. This audio content may be delivered on the same or different mediums as the video content.

FIG. 1 depicts an embodiment of the invention wherein the video source 14 is external to the compositor device 12. In other embodiments of the invention, the video source 14 may be internal to the compositor device 12. For example, the compositor device 12 may comprise a DVD player or may comprise a memory having stored video data. In yet other embodiments, the compositing system 10 may comprise at least one video source 14 that is internal and at least one video source 12 that is external to the compositor device 12.

With continued reference to FIG. 1, the compositing system 10 includes the video recorder 16. The video recorder 16 comprises any device, system or technology that is capable of converting real-time video images into an electronic signal, such as a digital or an analog signal. In one embodiment, the video recorder 16 is capable of the real-time conversion of and transmission of video images. In one embodiment, the video recorder 16 is a video camera. For example, the video recorder 16 may comprise a camcorder, such as an analog camcorder or a digital camcorder. The video recorder 16 may be coupled to the compositor device 12 through an RCA cable, an S-cable, a coaxial cable, Ethernet, wireless technologies and the like.

In other embodiments of the invention, the compositing system 10 may include multiple video recorders 16, each being coupled to the compositor device 12. For example, multiple video cameras may be coupled to the compositor device 12. In addition, the video recorder 12 may be internal or external to the compositor device 12.

The compositing system 10 also comprises the display 18. The display 18 receives an output signal from the compositor device 12 and converts the output signal to at least a video image. For example, in one embodiment of the invention, the display 18 comprises a television that is coupled to the compositor device 12 through RCA cables. In other embodiments, the display 18 may include a video projector, a monitor or the like and may be coupled to the compositor device 12 through any medium that provides for video signal transmission, as has been previously described.

In other embodiments of the invention, the display 18 may also be used to provide instructions or data to the user or users of the compositing system 10. For example, menu selections or command prompts may be displayed to the user through the display 18. In addition, dialogue prompts, such as are used in general karaoke machines may be portrayed on the display 18 so as to assist a user in reciting the appropriate lines.

In other embodiments of the invention, the compositing system 10 may comprise multiple displays 18. The display 18 may also be internal or external to the compositor device 12. For example, the compositor device 12 may include a screen that portrays a video image to the user. Such a screen would allow a user to have visual feedback as to the final output of the compositing system 10 without having to look at an external display.

In one embodiment, the compositing system 10 may also comprise a media storage device (not shown) that stores the signal output by the compositor device 12. For example, the compositor system 10 may comprise a memory configured to store in digital form a copy of the output signal that is sent to the display 18. In another embodiment, the compositing system 10 may output a signal only to the media storage device instead of the display 18. In such an embodiment, the output video and audio content could be stored for later playback on another device. In yet other embodiments, the media storage device may be included with the display 18.

Figure 2:
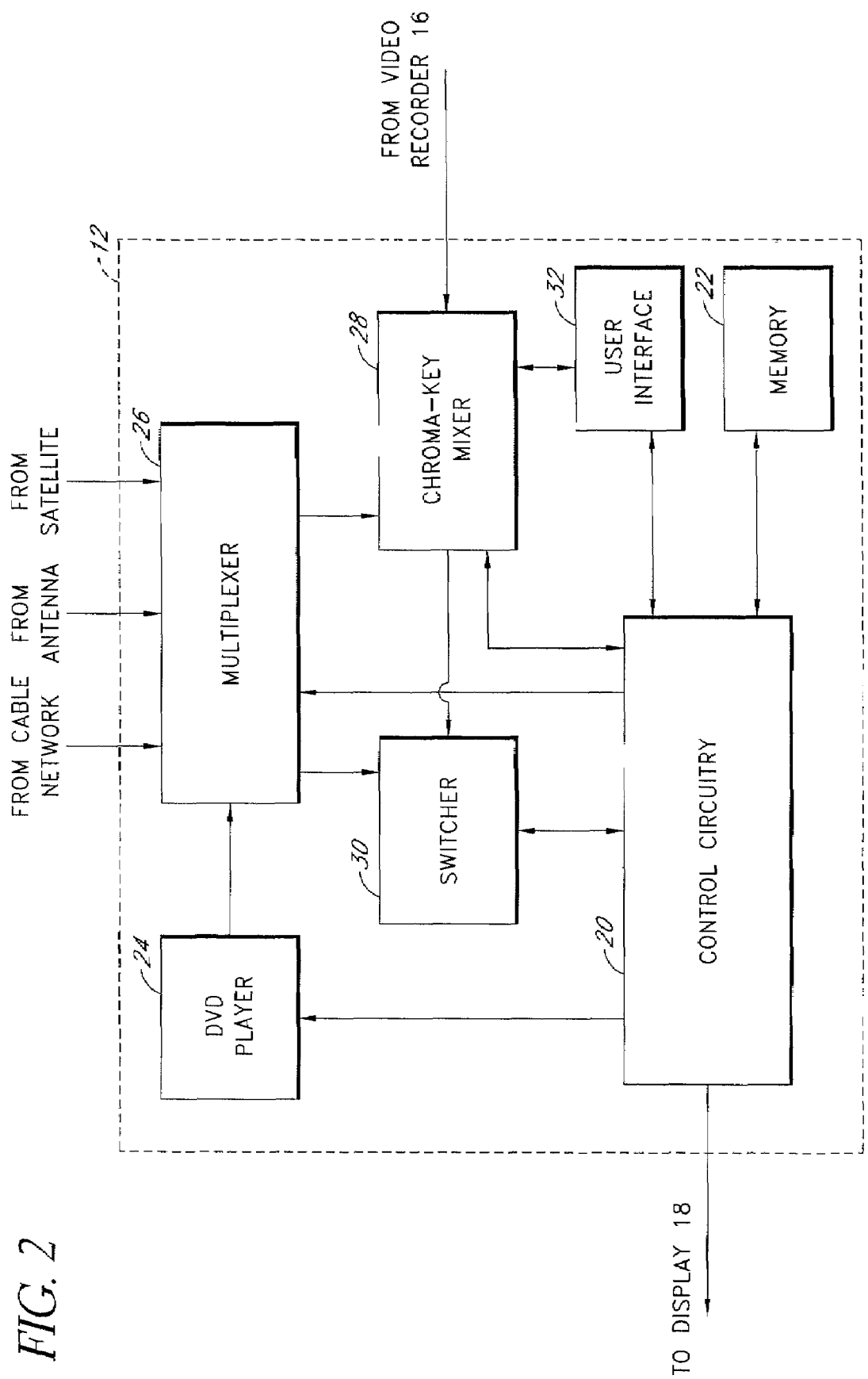
FIG. 2 is a block diagram of one embodiment of a compositor device.

FIG. 2 illustrates a block diagram of one embodiment of the compositor device 12. The compositor device 12 allows a user to selectively overlay images in real time onto a second video image, such as prerecorded video content. In one embodiment, the compositor device 12 comprises control circuitry 20, a memory 22, a DVD player 24, a multiplexer 26, a chroma-key mixer 28, a switcher 30 and a user interface 32.

In one embodiment, the components of the compositor device 12 are modules that comprise logic embodied in hardware or firmware, or that comprise collection of software instructions written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. For example, in one embodiment, the functions of the compositor device 12 may be implemented in whole or in part by a personal computer or other like device.

It is also contemplated that the components of the compositor device 12 need not be integrated into a single box. The components can be separated into several subcomponents or can be separated into different devices that reside at different locations and that communicate with each other, such as through a wired or wireless network, or the Internet. Multiple components may be combined into a single component. It is also contemplated that the components described herein may be integrated into a fewer number of modules. One module may also be separated into multiple modules.

The control circuitry 20 manages the operation of components of the compositor device 12. In one embodiment, the control circuitry 20 is a special purpose microprocessor. In other embodiments, the control circuitry 20 may be implemented as an application-specific integrated circuit (ASIC). In yet other embodiments, the control circuitry 20 may be implemented as one or more modules, which modules may be configured to execute on one or more processors. The modules may comprise, but are not limited to, any of the following: hardware or software components such as software object-oriented software components, class components and task components, processes, methods, functions, attributes, procedures, subroutines, segments of program code, drivers, firmware, microcode, applications, algorithms, techniques, programs, circuitry, data, databases, data structures, tables, arrays, variables, or the like.

The control circuitry 20 communicates with the memory 22. The memory 22 may comprise any buffer, computing device, or system capable of storing computer instructions and data for access by another computing device or a computer processor, such as, for example, the control circuitry 20. In one embodiment, the memory 22 comprises random access memory (RAM). In other embodiments, the memory 22 may comprise other integrated and accessible memory devices, such as, for example, read-only memory (ROM), programmable ROM (PROM), and electrically erasable programmable ROM (EEPROM). In another embodiment, the memory 22 comprises a removable memory, such as a floppy disk, a compact disk (CD), a ZIP® disk, a DVD, a removable drive or the like.

In one embodiment, the memory 22 stores data files that include data or information regarding the content of particular media. In one embodiment, a data file or a group of related data files contains information specific to a particular movie or prerecorded video footage. For example, data files for a particular movie may be referenced by using the movie's unique serial number. The information contained in the data files may identify scenes or segments of the particular movie or video that have been catalogued as being suitable for video compositing. The data files may also contain content relating to dialogue prompts for particular characters, menu options, and other data relating to scenes available for video compositing.

In one embodiment, the data files contain reference information that identifies particular frames or points in a video source that may be later used in the compositing process. For example, in one embodiment the reference information is used by the composting device 12 to identify the frames of a movie scene in which a particular character is present. In one embodiment, the reference information may be used to trigger multiple signals for use in the compositing process. For example, the reference information may contain both beginning and ending reference points, wherein the beginning reference point indicates the commencement of a particular feature in the video source, such as the entrance of a character into a scene, and wherein the ending reference point identifies the ending of a particular feature, such as when the character leaves the scene.

The term "reference information" as used herein is a broad term and is used in its ordinary sense and includes without limitation any type, or combination of types, of data that stores or contains information regarding particular media. For example, as described above, reference information may comprise reference points that identify scenes containing particular characters. However, reference information is not limited to such reference points. In other embodiments of the invention, reference information may comprise code, symbols, alphanumeric information, or the like that represent a song, a particular event, or a particular image that is contained or represented in particular media, such as an audiovisual signal.

In one embodiment, data files may be stored in the memory 22. For example, data files stored in the memory 22 may contain information relating to the individual frames of a particular movie, such as Star Wars. In one embodiment, the preprogrammed data files associated with Star Wars would identify scenes in the movie that have been selected as being suitable as a background scene for video compositing. The data files may identify when a particular character, such as Darth Vader®, is present in a specific scene. This data file information allows for the user to chose between pre-selected scenes and facilitates the generation of a signal by the control circuitry 20 to be used in coordinating and creating a composite video signal. The data files may be preprogrammed in the memory 22. In other embodiments, the data files may be later saved in the memory 22 by the user.

In other embodiments, the data files need not be stored in the memory 22. The data files may be generated in real time, generated on the fly, derived or received from an external source or device, or generated by the compositor device 12 itself. For example, data files for particular media could be downloaded from the Internet, transferred from a removable storage medium, or even programmed by the user. The data files may also be embedded in a closed-caption signal or be saved on a DVD, such as in a bonus material section, that contains the corresponding movie.

Although the memory 22 is depicted as being external to the control circuitry 20, in other embodiments of the invention, the memory 22 may be internal to the control circuitry 20. For example, the memory 22 may exist as a cache in the control circuitry 20. The memory 22 may also be external to the compositor device 12. For example, in one embodiment, the memory 22 comprises an external hard drive. The memory 22 may also comprise multiple memory devices for storing data or information.

The DVD player 24 is one embodiment of a video source for the compositor device 12. The DVD player 24 functions as a general purpose DVD player and outputs video and audio content stored on a DVD to the multiplexer 26. The DVD player 24 also includes a counter that adjusts itself based on which frame of the DVD is being read. For example, the DVD counter may correlate each frame of the DVD with a specific time code relating to the media stored on the DVD. This counter enables the DVD player 24 to jump to, identify or read specific frames of video content stored on DVDs. The DVD player 24 also reads DVD serial numbers so as to identify the media content contained by the particular DVD and may communicate the serial number to the control circuitry 20.

The functioning of the DVD player 24 may be controlled by the control circuitry 20, which loads appropriate data files from the memory 22. For example, when a Star Wars DVD is placed in the DVD player 24, the DVD player reads the serial number of the DVD and communicates the number to the control circuitry 20. The control circuitry 20 uses the serial number to find the appropriate data files stored in the memory 22. The data files identify the media content of the DVD as being the Star Wars movie and also identify which scenes, or frames, are to be played by the DVD player 24. In this way, the control circuitry 20 is able to manage the functioning of the DVD player 24.

In one embodiment of the invention, the DVD player 24 also reads DVDs that contain data as opposed to a movie or a video. For example, in one embodiment, the DVD player 24 is used to read DVDs that contain data files that are associated with several movies or videos, which data files may be copied to the memory 22.

With continued reference to FIG. 2, other video sources, such as external video sources, may communicate with the compositor device 12. In one embodiment, the multiplexer 26 is configured to accept signals from multiple external sources as well as from the DVD player 24. For example, the multiplexer 26 is shown as being structured to receive signals from the DVD player 24, a cable network, an antenna and a satellite. In other embodiments, the multiplexer 26 may be configured to receive fewer or more signals. For example, multiplexer 26 may be configured to receive a streaming video over the Internet or data from a cable box. The multiplexer 26 may also be configured to receive auxiliary signals from an external DVD player or a VCR.

The multiplexer 26 is structured to select one of multiple input signals, the selection being based on a control signal. In one embodiment, the control circuitry 20 supplies the control signal to the multiplexer 26. In another embodiment, the multiplexer 26 automatically selects the signal from the DVD player 24 when a DVD is inserted therein and selects the signal from the other available signals when no DVD is present in the DVD player 24. For example, in one embodiment, the user may input a selection through the user interface 32.

As shown in FIG. 2, one embodiment of the multiplexer 26 outputs the selected signal to the chroma-key mixer 28 and the switcher 30. In other embodiments of the invention, other switching devices or routers may be used in place of the multiplexer 26 to select between multiple input signals and to communicate the selected signal to other components. In other embodiments of the invention, the multiplexer 26 may receive signals from other video sources. The multiplexer 26 may also be coupled to more or fewer video sources than are depicted in FIG. 2.

The term "chroma-key" as used herein is a broad term and is used in its ordinary sense and refers to without limitation a system, device, or process that is used to create an effect wherein at least one color or hue in a video image is eliminated or substituted for with a different image. For example, a chroma-key technique, also referred to as color separation overlay, may utilize a mixer or like device to substitute a color, such as blue or green, in one video image for portions another video image.

The chroma-key mixer 28 receives, as inputs, signals from the multiplexer 26 and from the video recorder 16. The chroma-key mixer 28 processes these two input signals to form an output composite signal, which is communicated to the switcher 30. The chroma-key mixer 28 may also receive control signals from the control circuitry 20 or from the user interface 32.

In one embodiment of the invention, the chroma-key mixer 28 is used to create special visual effects that utilize the combination of two video signals to produce one composite image. In particular, the chroma-key mixer 28 is used to produce a composite image wherein it appears the subject from one video source, such as footage being captured by a video camera, is inserted into the footage from another video source, such as a movie on a DVD. This mixing by the chroma-key mixer 28 may be accomplished in real time.

In one embodiment, the chroma-key mixer 28 produces a composite image by subtracting a chroma element or elements from the real-time image, such as an image being captured by the video recorder 16. The chroma element comprises at least one color that has been pre-selected or that is selected by the user, which color is used in the background for the video-recorded image. Upon receiving the real-time signal, the chroma-key mixer 28 removes the chroma element (the background) from the video recorded image, leaving only the image of the target subject.

For example, in so-called "green screening," a target subject is positioned in front of a solid green screen. The image of the target subject is then captured by a video recorder and transmitted as a signal to the chroma-key mixer 28. The chroma-key mixer 28 subtracts the chroma element (green) from the video recorder signal. This leaves only the image of the target subject along with "blank" portions where the real-time image had contained the chroma element. The chroma-key mixer 28 then replaces the subtracted, or blank, portions of the real-time image with portions of the image contained by the signal from the multiplexer 26, which signal contains scenes from a movie on a DVD. As a result of the signal processing, it appears that the target subject image, which is a real-time image, is present in a movie or other prerecorded video, thus forming a composite image. In other words, the composite image is made up of at least two video components: a foreground image, which consists of the non-chroma element portions of the video recorder signal, and a background image, which consists of the signal received from the multiplexer 26.

Though this example describes the functioning of one embodiment of the chroma-key mixer 28, one with skill in the art will recognize that there exist other processes that may be used to produce a composite signal. For example, the chroma-key mixer 28 may directly substitute portions of the video source signal for the chroma-element portions of the real-time video signal. In another embodiment of the invention, the chroma-element portions of the real-time video signal are made transparent by the chroma-key mixer 28. This allows the non-chroma element portions of the real-time video signal to be layered on top of the video source signal to create the composite image.

Though the example given above has been in reference to an embodiment of the invention utilizing green as the chroma element, other colors may be used. For example, blue or red may be designated as the chroma element. In addition, multiple shades of the same color may be identified as chroma elements, allowing for a finer tuning of the composite image by the chroma-key mixer 28. For example, in one embodiment of the invention, the user is able to select portions (or colors) of the real-time image that the user wishes to remove or make transparent by designating the colors as chroma elements.

The chroma-key mixer 28 may perform the above-described process through various techniques. For example, in one embodiment of the invention, the chroma-key mixer 28 utilizes digital processing to create the composite image. In other embodiments, the chroma-key mixer 28 may create the composite image through optical techniques or through the use of analog real-time circuits that are known in the art. In yet other embodiments, the chroma-key mixer 28 comprises a luminance key mixer, which performs video compositing based on the brightness of portions of an image instead of color.

In the embodiment of the invention depicted in FIG. 2, the chroma-key mixer 28 outputs the composite signal to the switcher 30. The switcher 30 also receives the output signal of the multiplexer 26. The function of the switcher 30 is to select a single output signal from multiple input signals. For example, in one embodiment, the switcher 30 selects between the signal from the multiplexer 26 and the composite signal from the chroma-key mixer 28. The switcher 30 makes its determination based on communications with the control circuitry 20. In particular, the operation of the switcher 30 is managed by the control circuitry 20 based on the information contained in the data files, such as reference information regarding the beginning and ending reference points.

In one embodiment, the control circuitry 20 cross-references each frame of a prerecorded video with the beginning and ending reference points contained in the data files corresponding to the specific video being played. When the DVD counter, whose value relates to the specific frame being played, matches or correlates with a beginning reference point value, the switcher 30 is automatically instructed to select the composite signal from the chroma-key mixer. As a result, a target image being captured by the video recorder 16 is "inserted" or superimposed in the prerecorded video scene. When the DVD counter matches or correlates with an ending reference point, the switcher 30 is automatically instructed to select the signal from the multiplexer 26, thus removing the image of the target subject from the prerecorded video scene.

For example, suppose a user wants to insert himself or herself for Darth Vader® in a video clip from Star Wars, which is being played by the DVD player 24. First, the data files for the movie Star Wars that contain information relating to the video footage of Darth Vader® are accessed by the control circuitry 20. During frames not containing video footage of Darth Vader®, the signal from the multiplexer 26 (which comes from the DVD player 24) is selected by the switcher 30, which signal may be shown by the display 18. Viewers of the display 18 will see the normal footage from the Star Wars movie. The signal from the multiplexer 26 is selected by the switcher 30 until the control circuitry 20 instructs the switcher 30 to select the composite signal from the chroma-key mixer 28. This switching to the composite signal occurs when video footage of Darth Vader® is contained in the video source signal. The control circuitry 20 can identify the footage containing Darth Vader® by cross-referencing the relevant beginning and ending reference points from the data files. The beginning reference points identify the points or times in the movie when Darth Vader® enters a scene. As a result, when a beginning reference point matches or correlates with the DVD counter, which identifies a particular point of time or frame in the movie, the control circuitry 20 instructs the switcher 30 to select as an output the composite signal from the chroma-key mixer 28. Instead of seeing Darth Vader® on the display 18, viewers see in his place the image of the real-time target subject, which is being captured by the video recorder 16.

The ending reference points identify the points or times in a movie when Darth Vader® leaves a movie scene. When an ending reference point matches or correlates with the DVD counter, the control circuitry 20 then instructs the switcher 30 to select as an output the signal from the multiplexer 26. As a result, the target image, which is being captured by the video recorder 16, is not shown on the display 18.

The reference information, therefore, is used in one embodiment of the invention to automatically control the switching process between the signal from the video source 14 and the composite signal from the chroma-key mixer 28. For example, in one embodiment of the invention the reference information comprises beginning and ending reference points that correspond to the presence of a particular character in a movie or that indicate other points when it would be desirable to superimpose a real-time target image on a prerecorded image. The reference information of the data files may also be used to manage the audio components of the signals received from the multiplexer 26 and the video recorder 16. For example, in one embodiment, the control circuitry 20 instructs the switcher 30 to: (1) include only the audio component of the signal from the multiplexer 26 in the output signal, (2) include only the audio component of the signal from the video recorder 16 in the output signal, or (3) include both the audio components of the signals from the multiplexer 26 and the video recorder 16 in the output signal.

In another embodiment, the reference information is also used to manage the display of voice prompts, such as are used in karaoke files. For example, the reference information may indicate when to show voice prompts for a particular character when the character enters a scene. The reference information may also indicate when to remove or not display voice prompts for the particular character. In such an embodiment of the invention, the reference information corresponding to voice prompts may be located in the same data file as, or in a separate data file from, the reference information corresponding to video or audio components of the video source.

Although, the terms "beginning reference points" and "ending reference points" are used herein to describe the functioning of the compositing system 10, one with skill in the art will recognize that the beginning and ending reference points may be structurally and functionally equivalent. For example, in one embodiment, reference points stored in the data files are not identified as beginning or ending reference points. The reference points may be used by the control circuitry 20 to output a signal that causes the switcher 30 to change its state no matter what state the switcher was operating in previously.

With continued reference to FIG. 2, the depicted embodiment of the compositor device 12 comprises the user interface 32. The user interface 32 comprises any interface that accepts input from a user and/or conveys information to a user. In one embodiment, the user interface 32 is coupled to the chroma-key mixer 28 and to the control circuitry 20. In other embodiments, the user interface 32 may be coupled to more or fewer components of the compositor device 12. For example, the user interface may be directly coupled to the DVD player 24 to control the operation of the DVD player without the use of the control circuitry 20.

Figure 3:
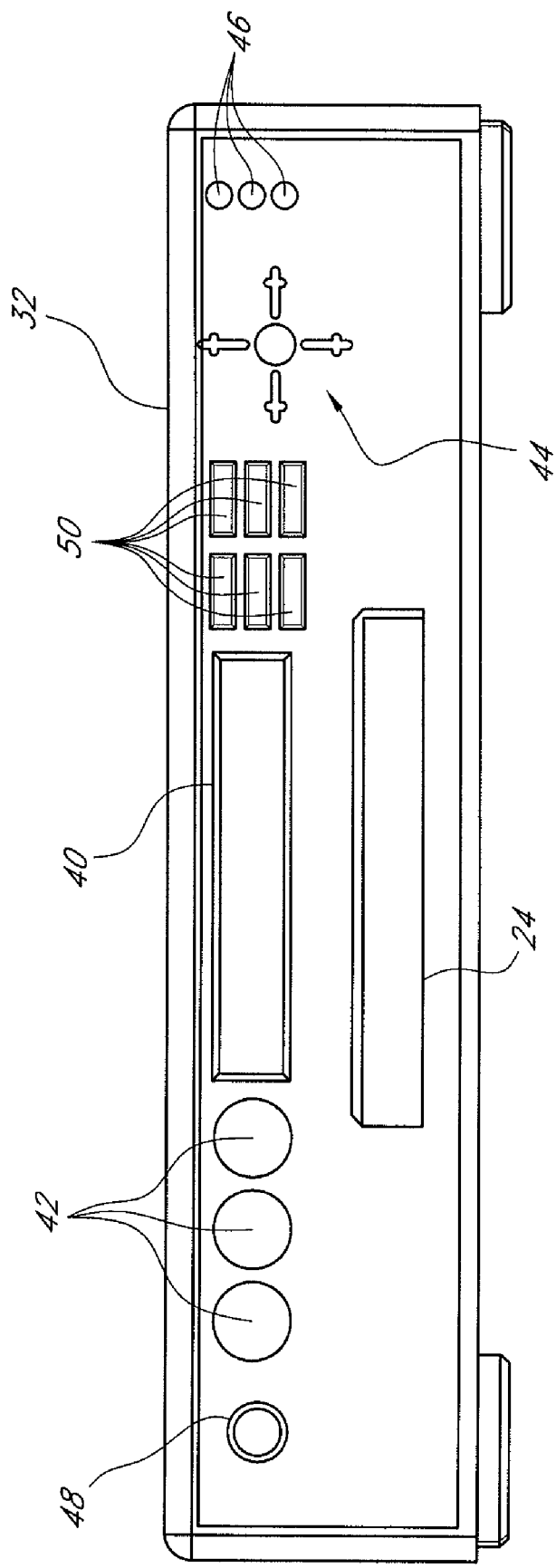
FIG. 3 illustrates a user interface of one embodiment of a compositor device.

One embodiment of the user interface 32 is illustrated in FIG. 3. The user interface 32 comprises a front tray portion of the DVD player 24, a display 40, editing controls 42, cropping/chroma controls 44 and a camera input display 46. In other embodiments of the invention, the user interface 32 may comprise more or fewer components. For example, the user interface 32 may operate without the display 40 or without the editing controls 42.

The display 40 conveys to the user information regarding the operation of the compositor device 12. For example, the display 40 may depict information regarding the tracks of an inserted DVD (either by time or by frame number), the chroma color selections, the data files (such as the film title or the tracks/scenes available for substitution) and other information to assist the user. In one embodiment, the display 40 is a light emitting diode (LED) display. In other embodiments, the display 40 is a liquid crystal display (LCD). The display 40 may convey information through the use of graphics, characters, or both.

The cropping/chroma controls 44 allow a user to allow a user to modify in real time the video image being captured by the video recorder 16 so that the image conforms to the prerecorded video scene in which the image is inserted. In one embodiment, the cropping/chroma controls 44 allow the user to select the chroma element or elements to be subtracted from the captured video image. Such selection may be made by selecting the name of a particular color or by selecting a visual representation of the color that is shown on the user interface display 40 or the external display 18.

The cropping/chroma controls 44 also allow the user to crop the captured video image such that it "fits" in the prerecorded background image. These controls may be used to zoom out or zoom in on a target subject in order to adjust the size of the target subject to be in proportion with other objects in the prerecorded scene on to which the target subject is superimposed.

Other embodiments of the invention may contain other controls for modifying the captured video. For example, the user interface 32 may comprise a color saturation control that adjusts the color level of the captured video. This allows for a color image to be adjusted so as to blend in a black and white background.

The camera input display 46 identifies the video recorders 16 that are connected to the compositor device 12 and that are available to capture video for processing. For example, if multiple video recorders 16 were coupled to the compositor device 12, then multiple lights of the camera input display 46 may be illuminated. In other embodiments of the invention, the camera input display 46 identifies when the video being captured by one of the video recorders 16 is being processed and output to the display 18. In other embodiments of the invention, the user interface 32 does not include the camera input display 46.

In one embodiment, the user interface 32 also comprises controls that are generally found on CD/DVD players. For example, the user interface comprises a power button 48 to turn the machine on and off. The user interface also comprises DVD/CD controls 50, such as play, rewind, fast forward, stop, pause, eject and the like, that are used to control the operation of the DVD player 24.

In one embodiment, the user interface 32 also includes a remote control input (not shown). The remote control input may accept instructions or data that are transmitted to the user interface 32 from one or more remote control devices. These instructions may correspond to controls that are present on the user interface 32 or may include more or fewer instructions that enable the user to manage the operation of the compositor device 12.

Though FIG. 3 depicts one implementation of the user interface 32, other types of user interfaces may be used in other embodiments. For example, the user interface 32 may comprise a touch screen that both displays information to a user and accepts input from the user. In other embodiments, the user interface 32 may accept instructions through voice recognition or may be coupled to another system or device, such as a keyboard or personal computer, that accepts input from a user. In yet other embodiments, the compositor device 12 operates without a user interface 32. In such embodiments, a user interface may be incorporated into the display 18. For example, display 18 may show on-screen instructions to a user or accept commands inputted by the user.

As shown by the embodiment of the compositor device 12 in FIG. 2, the control circuitry 20 manages the content of the signal outputted to the display 18. In one embodiment, the output of the switcher 30 is coupled to the control circuitry 20. In such an embodiment, the control circuitry 20 may select to output the signal from the switcher 30 or may output other video content that is stored in the memory 22. For example, in one embodiment, prerecorded scenes are stored in the memory 22, and upon input from the user, the control circuitry 20 outputs these scenes instead of the signal from the switcher 30. In another embodiment, the control circuitry 20 is used to overlay information such as subtitles or dialogue prompts over the signal from the switcher 30. In yet other embodiments of the invention, the output of the switcher 30 is coupled to the display 18 without intervention by the control circuitry 20.

In yet other embodiments of the invention, the compositor device 12 includes input/output ports (not shown) that interface with external systems or devices. For example, the compositor device 12 may comprise a serial port, a universal serial bus (USB), a firewire port, or the like that can be used to download data files from a personal computer or handheld device.

Figure 4:
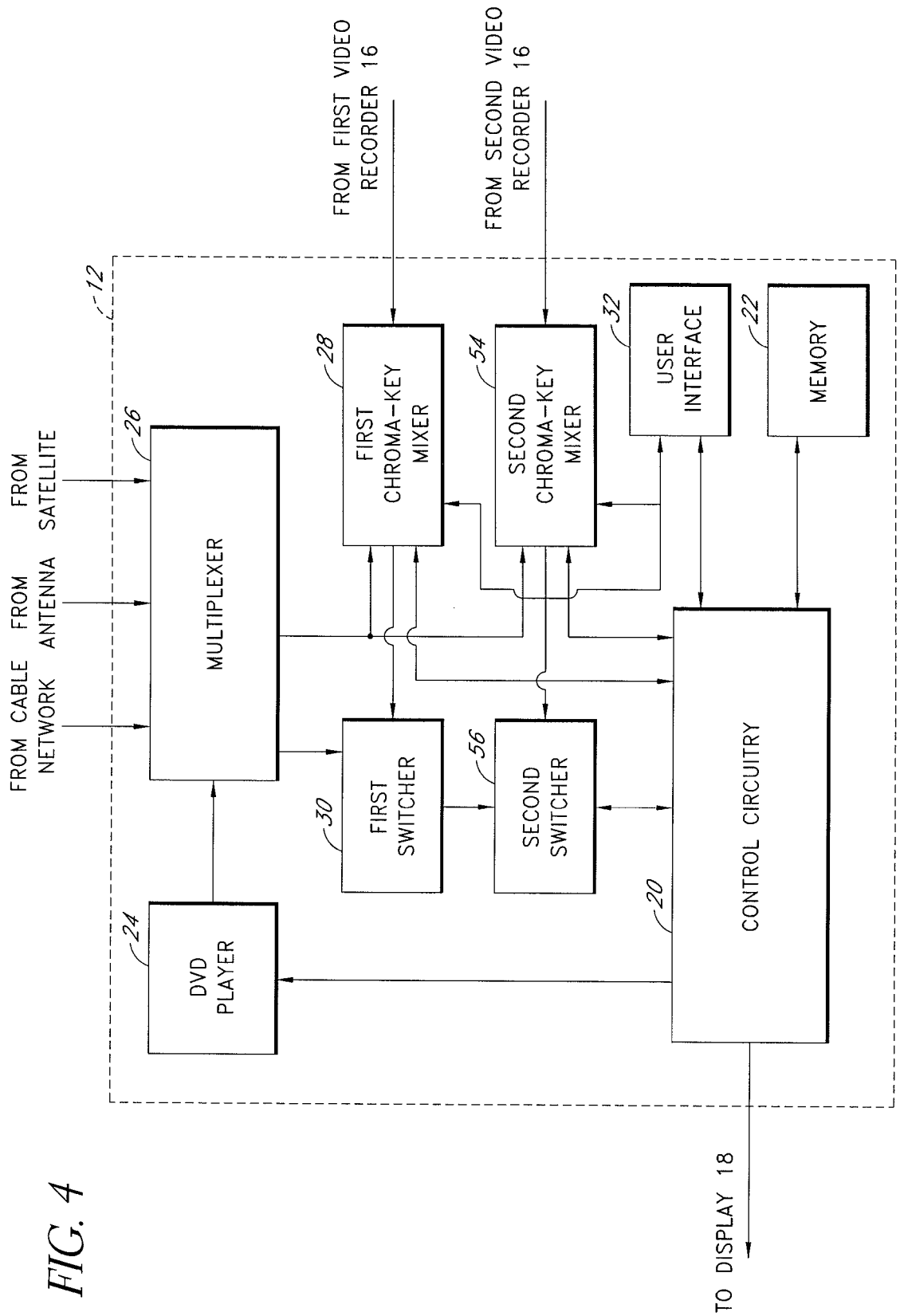
FIG. 4 is a block diagram of an embodiment of a compositor device that is structured to receive input from two video recorders.

FIG. 4 is a block diagram of an embodiment of the invention wherein the compositor device 12 is structured to receive input from multiple video recorders. As can be seen in FIG. 4, the compositor device 12 includes the same components as the embodiment of the compositor device 12 depicted in FIG. 2. The compositor device 12 of FIG. 4 additionally comprises a second chroma-key mixer 54 and a second switcher 56.

In one embodiment, the second chroma-key mixer 54 functions similarly to the first chroma-key mixer 28. In particular, the second chroma-key mixer 54 receives, as inputs, signals from the multiplexer 26, the first chroma-key mixer 28 and a second video recorder 16. The second chroma-key mixer 54 may also receive instructions from the control circuitry 20. Like the first chroma-key mixer 28, the second chroma-key mixer 54 removes the chroma element from a real-time image, such as captured by the second video recorder, and combines the modified real-time image with another signal to form a composite signal. In an embodiment having two video recorders, the second chroma-key mixer 54 may combine the real-time image captured by the second video recorder with either the prerecorded video from the multiplexer 26 or the composite signal outputted by the first chroma-key mixer 28. The second chroma-key mixer 54 then outputs a second composite signal to the second switcher 56.

In other embodiments, the second chroma-key mixer 54 may be external to the compositor device 12. In yet other embodiments, portion of the second chroma-key mixer 54 may be external to the compositor device 12 and portions of the second chroma-key mixer 54 may be internal to the compositor device 12.

The second switcher 56 functions similarly to the first switcher 30. In one embodiment, the second switcher 56 receives, as inputs, signals from the first switcher 30 and from the second chroma-key mixer 54. The second switcher 56 selects between these inputs based upon instructions received from the control circuitry 20. The second switcher 56 may output a signal to the control circuitry 20 or to the display 18. In one embodiment of the invention, the content of the output signal of the second switcher 56 may be: (1) the prerecorded signal from the multiplexer 26, (2) the composite signal from the first chroma-key mixer 28 having portions of an image from the first video recorder, (3) the second composite signal from the second chroma-key mixer 54 having portions of an image from the second video recorder, or (4) the second composite signal from the second chroma-key mixer 54 having portions of images from the first video recorder and from the second video recorder.

Figure 5:
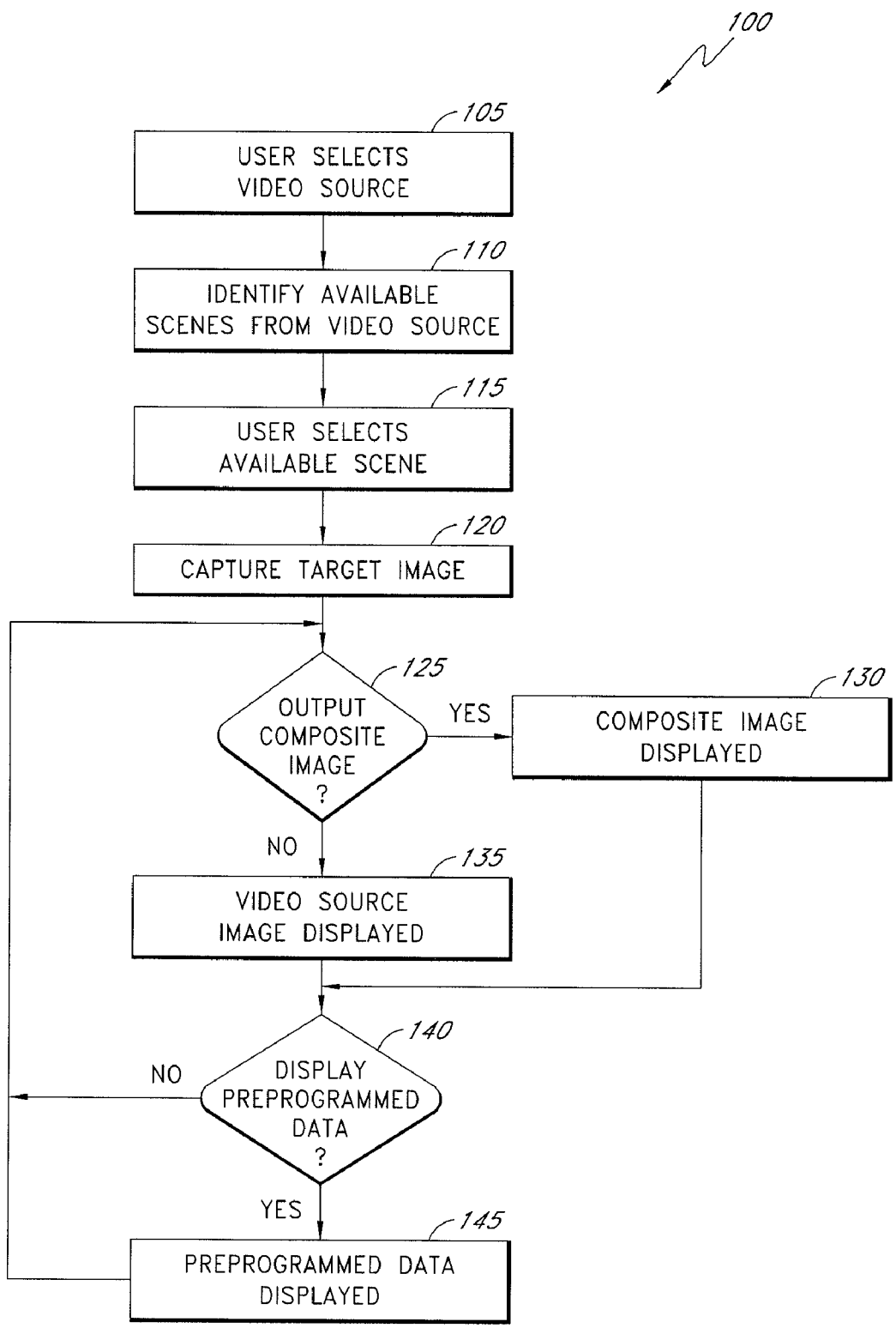
FIG. 5 is a flow chart depicting one embodiment of an interactive video compositing process.

The operation of one embodiment of the video compositing system will now be described. FIG. 5 illustrates one embodiment of an interactive video compositing process 100. The compositing process 100 begins with State 105. At State 105, the user selects a video source that the user wants to use as a background image for a final composite image. For example, the user may insert a favorite movie into the DVD player 24.

After the user has selected a particular video source, the compositing process 100 continues with State 110. At State 110, data files associated with the video source are accessed by the compositor device 12. For example, when a DVD is inserted into the DVD player 24, the serial number of the DVD is communicated to the control circuitry 20, which uses the serial number to identify and access the appropriate prerecorded data files. The data files identify scenes recorded on the DVD that have been catalogued as being suitable for chroma key substitution. In one embodiment of the invention, the suitable scenes are identified by the data files stored in the memory 22 of the compositor device 12. These data files may have been preprogrammed in the memory 22, may have been downloaded or saved from another source, or may be saved on the selected DVD, such as in the bonus materials section of the DVD. In one embodiment, the scenes catalogued as being available for chroma-key substitution generally contain video footage of a character for which a user can substitute his or her own image. In one embodiment, the data files comprise reference information that identifies which scenes of the DVD contain video footage of the particular character.

The available scenes are communicated to the user, such as through the display 40 of the user interface 32. In another embodiment, the available scenes may be communicated through an external display, such as display 18. At State 115, the user selects an available scene into which the user wants to superimpose or "insert" a real-time image. In one embodiment, the user makes the selection through the user interface 32, such as through a remote control.

After the user selects an available scene, the compositing process 100 proceeds with State 120. At State 120, the video recorder 16 is used to capture a target image. This target image is the image that is used to overlay, or be inserted into, in real time, the scenes from the video source. The target image is preferably positioned in front of an evenly lit, solid colored background, which color represents the chroma element. For example, in one embodiment of the invention wherein the selected chroma element is green, the target image is positioned in front of a "green screen." Other colors or types of backgrounds may be used that enable the background to be later "removed" when forming a composite image with scenes from the video source.

In one embodiment, a video camera is utilized to capture the target image and convert the image into a signal that is input into the chroma-key mixer 28 of the compositor device 12. It should be recognized that, along with a video image, an audio signal may also be recorded by the video camera and input into the compositor device 12.

The chroma-key mixer 28 of the compositor device 12 creates a composite image through the processes that have been previously discussed. In one embodiment, the chroma-key mixer 28 removes the chroma element from the image captured by the video camera, leaving only the video image of the target image. Then, corresponding portions of the image from the video source are used to fill in the removed portions of the video recorded image, thus forming a composite image that appears to have the target image inserted into scenes from the video source.

In another embodiment, the chroma element portions of the video-captured image are made transparent, such as through digital processing, leaving only the target image. The modified video-captured image is then layered on top of the video source image. As a result, portions from the background video source image that are located underneath the top layer target image are not seen on the display of the composite image. However, portions of the background video source image located underneath the transparent portions of the top layer (those portions that had contained the chroma element) are viewable.

The compositing process 100 then moves to State 125. At State 125, it is determined whether the video source image or the composite image is to be selected as the output image. In one embodiment, this selection of the output image is made by the switcher 30. The control of this selection may be performed automatically (without user interaction) by the compositor device 12 using information from the prerecorded data files, or the user may control the operation of the switcher 30 through the user interface 32. For example, the control circuitry 20, based upon the beginning and ending reference points contained in the data files, may instruct the switcher 30 when to output the video source image and when to output the composite image that has the target image overlaid on the video source image. In another embodiment, the user may also manually control when such switching occurs. Such manual control allows the user more freedom to create desired scenes or special effects.

If at State 125, the switcher 30 is instructed to select the composite image, the compositing process 100 moves to State 130. At State 130, the composite image is shown on the display 18. Viewers of the display 18 will observe the real-time target image inserted into the prerecorded footage from the video source. For example, viewers may see the target image replacing a character in a movie playing on the DVD player 24. After State 130, the compositing process 100 moves to State 140.

If at State 125, the switcher 30 is instructed to select the video source image, the compositing process 100 moves to State 135. At State 135, the image from the video source is shown on the display 18. After State 135, the compositing process 100 then proceeds to State 140.

At State 140, it is determined whether or not preprogrammed data is to be displayed instead of the video source image or the composite image. Such preprogrammed data may include, for example, prerecorded scenes that are stored in the memory 22. In one embodiment, the prerecorded scenes comprise video clips that users may want to insert in order make the displayed scenes appear more interactive or to appear more life-like. For example, prerecorded video clips having various forms of feedback from judges could be inserted after a target subject has acted out a scene (which was observed by the viewers of the display 18). In one embodiment, different video clips are selected to be displayed based on input given by the viewers.

If preprogrammed data is to be displayed, the compositing process 100 moves to State 145. At State 145, the preprogrammed data is communicated to the display 18. In one embodiment, the control circuitry 20 manages which signal is communicated to the display 18. In another embodiment, a multiplexer or other similar device may be used to select which signal is output to the display 18. The length of time that the preprogrammed data is displayed may be directly controlled by the user or may be a set length of time, such as, for example, until the end of the particular video clip. Upon completion of State 145, the compositing process 100 returns to State 140. If preprogrammed data is not to be displayed, the compositing process 100 returns to State 125 to determine whether the video source image or the composite image is to be displayed.

One with skill in the art will recognize that the compositing process 100 illustrated in FIG. 5 is only one example of the functioning of the compositing system 10. For example, in other embodiments of the invention, the compositing process 100 may include more or fewer states, or states may be combined or executed in a different order. For example, additional states may be added that illustrate the separate control of audio signals and video signals. In other embodiments, preprogrammed data may be displayed at the beginning of the compositing process 100 or upon the selection of a particular video source for playback.

The compositing system 10 may be particularly useful with preprogrammed video that is easily adapted to allow for user interaction. For example, to help further illustrate an embodiment of the compositing process 100, assume that the user selects a DVD that has recorded scenes from the television talent show American Idol. Data files corresponding to video segments of the DVD are stored in the memory 22 of the compositor device 12. Upon insertion of the DVD, the user is provided with options of scenes that are available for user interaction. For example, the user may have the option to select different scenes in which the user may "perform" in front of the judges or an audience.

Through the user interface 32, the user selects a scene for video compositing. For example, the user may pick a scene in which a contestant is performing by signing a song in front of the judges. A user whose image is going to be substituted into the American Idol footage is positioned in front of the video recorder 16 with a green screen serving as the background. The individual then performs as if he or she was actually participating on the American Idol program, the performance of the individual being captured by the video recorder 16 and converted to a signal communicated to the compositor device 12.

The display 18 shows video and audio from the American Idol program. During the American Idol scenes that would normally contain footage of the participant on the actual program, the image of the individual being recorded by the video recorder 16 is substituted in real time for the participant. As a result, it appears to viewers of the display 18 that the individual is actually participating on the American Idol program. The timing of the substitution of images is determined by the reference information recorded in the data files, which process has been described previously. In addition, the user may also manually control which images are output to the display 18.

Audio signals that are captured by the video recorder 16 are also output through the display 18. Like the video images, the substitution of the real-time audio signals from the video recorded footage may occur at appropriate points in the American Idol scenes, such as when the participant is performing or singing. The audio substitution need not occur at the same times as the video substitution. For example, there may exist portions of American Idol footage that contain the voice of the participant but that do not contain the video image of the participant. Again, the substitution of the audio signals may be automatically controlled by the compositor device 12 based on the data file information and/or may be manually controlled by the user.

After the performance, viewers have the option to rate the performance of the individual who has been inserted into the program. These viewer ratings may be used to select the display of prerecorded video clips having feedback from the judges on American Idol. For example, prerecorded video clips of good reviews, bad reviews, and average reviews may be stored in the memory 22 of the compositor device 12. The viewers then have the option of inputting their opinions of the performance, such as through remote controls communicating with the user interface 32. If the viewers rate the performance by the individual as being generally poor, then the compositor device 12 selects the playback of video clips that include the judges being critical of the performance. On the other hand, if the users rate the performance as being generally good, then the compositor device 12 selects the playback of video clips that give positive feedback from the judges.

In other embodiments of the invention, the above-described American Idol program may be stored entirely in the memory 22 of the compositor device 12 without the use of a DVD. In yet other embodiments, the compositor device 12 may include a monitor that display the appropriate voice prompts to the user, which prompts correspond to portions of the American Idol program. For example, the compositor device 12 may include a CD+input or player that reads files and outputs a display having voice prompts.

Although embodiments described herein have related generally to real-time video compositing with sources such as movies, television programs and the like, other embodiments of the invention may utilize any source of video, audio, or a combination thereof. For example, in another embodiment of the invention, the compositor device may accept video or audio input from a video game system. Such would allow a user to "insert" himself or herself into the video game and to interact with objects therein.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

What is claimed is:

1. A method for video compositing, the method comprising:
   receiving a first audio signal and a first video signal, the first video signal comprising video content having multiple frames, the video content representing a cinematic scene comprising at least first and second characters;
   receiving a second audio signal and a second video signal, the second video signal comprising a real-time video image of a participant, and the second audio signal being associated with the participant;
   creating a combined video signal comprising the first video signal and the second video signal, wherein portions of the combined video signal comprise the real-time video image of the participant, and wherein the combined video signal is configured to cause the display of the real-time video image of the participant as the first character in the video content;
   accessing data that corresponds to certain ones of the multiple frames of the first video signal, the data comprising,
      first reference data that identifies a first frame of the multiple frames in which the participant is to be displayed as the first character in the video content in place of the first character when the first character would have appeared in the cinematic scene,
      second reference data that identifies a second frame of the multiple frames in which the participant is to be removed as the first character in the video content, and
      third reference data that identifies a third frame of the multiple frames in which the participant is to be re-displayed as the first character in the video content in place of the first character when the first character would have re-appeared in the cinematic scene; and
   selectively switching between outputting the first video signal and outputting the combined video signal, wherein said selective switching is performed automatically based at least in part on the data that corresponds to the certain ones of the multiple frames of the first video signal, whereby at a first time identified by the first reference data the participant is displayed as the first character in the cinematic scene of the video content, whereby at a second time identified by the second reference data the cinematic scene of the video content is displayed without the participant, and whereby at a third time identified by the third reference data the participant is re-displayed as the first character in the cinematic scene of the video content.

2. The method of claim 1, wherein said selective switching is performed in real time with respect to the real-time second video signal.

3. The method of claim 1, wherein the data identifies time codes associated with the first video signal.

4. The method of claim 1, further comprising processing the second video signal to isolate the real-time video image of the participant from a background of the second video signal.

5. The method of claim 4, wherein said processing comprises chroma-key processing.

6. A method for coordinating the display of multiple signals, the method comprising:
   receiving a first signal comprising video content representing a scene comprising first and second original characters;
   receiving a second signal comprising a real-time video image of a participant; receiving a third signal comprising first audio content associated with the scene; receiving a fourth signal comprising second audio content associated with the participant;
   forming a combined video signal comprising portions of the first signal and portions of the second signal, wherein the combined video signal is configured to cause the display of the real-time video image of the participant in place of the first original character of the scene;
   receiving reference data that corresponds to portions of the first signal, the reference data comprising first reference data that identifies a first frame of the multiple frames in which the first original character is associated with the scene, and wherein the reference data comprises second reference data that identifies a second frame of the multiple frames in which the first original character is not associated with the scene; and alternating between (i) displaying the first signal and outputting at least the first audio content and (ii) displaying the combined video signal and outputting at least the second audio content, wherein the timing of said alternating is based on the reference data such that the combined video signal is selected at a first time identified by the first reference data whereby the participant appears in the scene at the time the first original character would appear in the scene and in place of the first original character, and such that the first signal is selected at a second time identified by the second reference data whereby the participant no longer appears in the scene.

7. The method of claim 6, wherein said receiving the second signal comprises receiving the second signal via a network.

8. The method of claim 6, further comprising receiving a third signal comprising a second real-time video image of a second participant.

9. The method of claim 8, wherein the combined video signal comprises portions of the first signal, portions of the second signal and portions of the third signal.

10. The method of claim 6, further comprising digitally removing a background of the second video signal to isolate the real-time video image of the participant.

* * * * *